(12) United States Patent
Verbowski

(10) Patent No.: US 9,968,981 B2
(45) Date of Patent: May 15, 2018

(54) VEHICLE SUSPENSION MODULE

(71) Applicant: Larry John Verbowski, Bay City, MI (US)

(72) Inventor: Larry John Verbowski, Bay City, MI (US)

( * ) Notice: Subject to any disclaimer, the term of this patent is extended or adjusted under 35 U.S.C. 154(b) by 0 days. days.

(21) Appl. No.: 15/423,728

(22) Filed: Feb. 3, 2017

(65) Prior Publication Data

US 2017/0144209 A1 May 25, 2017

Related U.S. Application Data

(60) Division of application No. 14/712,043, filed on May 14, 2015, now Pat. No. 9,597,937, which is a division of application No. 12/386,598, filed on Apr. 21, 2009, now Pat. No. 9,192,975, which is a continuation-in-part of application No. 12/322,267, filed on Jan. 30, 2009, now abandoned.

(51) Int. Cl.
*B21D 39/04* (2006.01)
*F16C 35/02* (2006.01)

(52) U.S. Cl.
CPC ............ *B21D 39/048* (2013.01); *F16C 35/02* (2013.01); *B60G 2204/43* (2013.01); *B60G 2206/93* (2013.01); *F16C 2226/52* (2013.01); *F16C 2326/05* (2013.01)

(58) Field of Classification Search
CPC ............ Y10T 403/49; Y10T 403/4933; Y10T 403/4941; Y10T 403/4949; Y10T 403/4966; Y10T 403/58; Y10T 403/581; Y10T 403/587; F16B 7/02; F16B 7/025; B21D 39/04; B21D 39/048; F16L 13/14; F16L 13/141; F16L 13/147; F16C 35/02; F16C 2226/52; F16C 2326/05
See application file for complete search history.

(56) References Cited

U.S. PATENT DOCUMENTS

| | | | | |
|---|---|---|---|---|
| 2,804,679 A | * | 9/1957 | Tracy | B21K 1/04 29/520 |
| 4,251,122 A | * | 2/1981 | McCloskey | F16C 23/045 29/898.043 |
| 4,355,250 A | * | 10/1982 | Langdon | F16C 23/04 310/88 |
| 4,747,810 A | * | 5/1988 | Shepley | F16C 13/006 384/192 |
| 4,910,788 A | * | 3/1990 | Shimizu | F16C 23/045 384/192 |
| 5,061,087 A | * | 10/1991 | Roerig | D21G 1/0226 384/192 |
| 5,073,038 A | * | 12/1991 | O'Connell | F16C 11/0614 384/203 |

(Continued)

*Primary Examiner* — Jonathan P Masinick

(57) ABSTRACT

A suspension module for the suspension systems of vehicles, which is easily removed and replaced in a repair mode. The suspension module comprises a suspension module, a bearing housed in the suspension module wherein the bearing is comprised of a spherical bearing in a housing, the spherical bearing being fixed in the suspension module housing by a crimp in the housing. There is a set of two adapter tubes and a retainer ring mounted on the distal end of the suspension module housing to retain the suspension module in a suspension knuckle of a vehicle suspension system. There is also disclosed a crimping tool for placing a crimp in the housing to retain the spherical bearing therein.

1 Claim, 7 Drawing Sheets

(56) References Cited

U.S. PATENT DOCUMENTS

| | | | | |
|---|---|---|---|---|
| 5,265,965 A * | 11/1993 | Harris | | F16C 23/045 384/192 |
| 5,660,482 A * | 8/1997 | Newley | | F16C 23/045 384/192 |
| 5,775,815 A * | 7/1998 | Abusamra | | F16C 11/0614 384/208 |
| 6,269,675 B1 * | 8/2001 | Burnett | | B25L 327/10 29/237 |
| 6,325,544 B1 * | 12/2001 | Sasaki | | F16C 11/0614 384/192 |
| 6,860,638 B2 * | 3/2005 | Fish | | F16C 33/201 384/192 |
| 6,974,258 B2 * | 12/2005 | Borcherding | | F16C 27/02 384/192 |
| 7,172,352 B2 * | 2/2007 | Close | | B41J 13/076 271/145 |
| 7,306,374 B2 * | 12/2007 | Hokkirigawa | | F16C 17/10 384/192 |
| 7,383,714 B2 * | 6/2008 | DiMilia | | B21D 39/048 29/237 |
| 7,386,714 B2 * | 6/2008 | Takatori | | G06F 9/4405 709/212 |
| 7,494,143 B2 * | 2/2009 | Verbowski | | B60G 11/20 267/273 |
| 7,717,434 B2 * | 5/2010 | Blessing | | F16J 15/0887 277/608 |
| 7,866,044 B2 * | 1/2011 | Nakano | | B21D 39/04 29/451 |
| 8,056,208 B2 * | 11/2011 | Karoliussen | | B21D 39/04 285/382.4 |
| 8,424,855 B1 * | 4/2013 | Verbowski | | F16F 1/393 267/140.12 |
| 8,745,869 B2 * | 6/2014 | Berghaus | | B21D 39/04 29/282 |
| 8,950,232 B2 * | 2/2015 | Van Essen | | B21D 37/00 72/402 |
| 9,132,471 B2 * | 9/2015 | Toepker | | B21D 39/04 |
| 9,216,449 B2 * | 12/2015 | Gatz | | B21D 39/00 |

* cited by examiner

VEHICLE SUSPENSION MODULE

This application is a divisional application of U.S. Ser. No. 14/712,043 filed May 14, 2015, currently pending, which is a divisional application of U.S. Ser. No. 12/386,598, filed Apr. 21, 2009, now U.S. Pat. No. 9,192,925, that issued Nov. 24, 2015, which is a continuation-in-part application of U.S. Ser. No. 12/322,267, filed Jan. 30, 2009, abandoned, from which priority is claimed.

The invention disclosed herein deals with a new and novel suspension module for the suspension systems of vehicles, which is easily removed and replaced in a repair mode. It also deals with a specialized crimping tool for fixing a component of the vehicle suspension module in the module.

BACKGROUND OF THE INVENTION

Spherical bearings are known in the art, for example, In U.S. Pat. No. 7,172,352, that issued to Close, et al on Feb. 6, 2007 there is shown a spherical bearing which is a bearing comprising a cylindrical bearing surface supporting a spherical journal surface.

In U.S. Pat. No. 5,061,087 there is disclosed a bearing apparatus for permitting axial rotational and angular movement of a doctor journal for a papermaking machine.

A slide bearing unit is described in U.S. Pat. No. 4,910,788 that issued on Mar. 20, 1990 to Shimizu which is a bearing in which a cylindrical outer cylinder is disposed on the outer periphery of an oil-impregnated bearing.

In U.S. Pat. No. 4,474, 810 a self-aligning idler that is belt driven is fixed with a spherical bearing.

Another such spherical bearing can be found in U.S. Pat. No. 4,355,250 that issued on Oct. 19, 1982 to Langdon which is self-aligning.

In still another U.S. Pat. No. 4,251,122 that issued on Feb. 17, 1981 to McCloskey shows another self-adjusting bearing assembly that uses a spherical bearing.

Rod end bearings comprising spherical bearings are disclosed in U.S. Pat. No. 2,804,679 to Tracy.

Bearings similar to those described in the prior art just above can also be found in U.S. Pat. No. 5,660,482 that issued on Aug. 26, 1997 to Newley, et al.; Fish, in U.S. Pat. Nos. 6,860,638; 5,265,965 that issued on Nov. 30, 1993 to Harris, et al; U.S. Pat. No. 6,325,544 that issued to Sasaki, et al.; U.S. Pat. No. 7,306,374 that issued on Dec. 11, 2007 to Hokkirigawa et al.; U.S. Pat. No. 6,974,258 that issued on Dec. 13, 2005 to Borcherdling, et al; U.S. Pat. No. 5,775,815 that issued on Jul. 7, 1998 to Abusamra, and U.S. Pat. No. 5,073,038, that issued on Dec. 17, 1991 to O'Connell, among others.

The majority of the prior: art dealing with crimping and swaging devices that was found by the applicant herein deals with hand held crimping and swaging devices useful for fixing compression sleeves or connector apparatus on pipes and hoses.

Such a device, for example is that disclosed by Burnett, in U.S. Pat. No. 6,269,675 that issued on Aug. 7, 2001 in which there are controllable jaws mounted such that they can be adjusted and operated by human hand activity.

In U.S. Pat. No. 7,383,714, that issued to Dimilia, et al on Jun. 10, 2008 there is disclosed a crimping machine that includes a linear mover that forces a ram plate assembly toward a base plate to radially contract an insert. The insert has an inner surface defining an interior dimension that mates with a fitting and crushes the fitting onto a flexible hose as the insert is radially contracted. The inserts are essentially flat plates that interface with the entire outside surface of the fitting such that the fitting is essentially crushed onto the pipe or hose that is being modified.

THE INVENTION

Thus, this invention deals with a new and novel vehicle suspension module for a vehicle suspension system, said suspension module having in combination a suspension module housing having a distal end and a near end.

A bearing housed in the suspension module housing, the bearing comprised of a bearing housing and a spherical bearing wherein the spherical bearing has a central opening, a first end, and a second end.

The spherical bearing rests against a machined stop at the second end and internally of the housing and the spherical bearing is fixed in the suspension module housing near the near end of the suspension module housing by a crimp in the housing.

There is a set of two adapter tubes, one adapter tube located in the first end and partially inserted in the central opening and the other adapter tube is located in the second end and partially inserted in the central opening such that the adapter tubes align with each other.

There is a retainer ring mounted on the distal end of the suspension module housing to retain the suspension module in a suspension knuckle of a vehicle suspension system.

In another embodiment, the suspension module is equipped with seals that fit over the adapter tubes to prevent the entry of dust and debris.

In yet another embodiment, there is a suspension module as set forth just Supra wherein, in addition, there is a single rod inserted through the seals, the adapter tubes, the housing, and the spherical bearing to support these components and align them with each other.

In a third embodiment there is in combination, the suspension module as set forth just Supra, a suspension knuckle of a vehicle suspension system, and an upper control arm of a vehicle suspension system.

The suspension module is fitted and surrounded by a suspension knuckle housing integral within a suspension knuckle and the suspension knuckle housing is joined, by the rod, to an upper control arm through two lower control arm extensions, one control arm extension on either side of the suspension knuckle housing.

Turning now to another embodiment of this invention, there is a mechanical crimping device comprising in combination a cup holder and a crimping cup.

The cup holder has a centered opening therethrough, the centered opening having a vertical axis and an inside wall, wherein the top of the centered opening is larger in diameter than the bottom centered opening to create in the inside wall, a beveled surface.

There is a crimping cup comprised of two identical halves having an outside wall surface, an inside wall surface, a top and a bottom, wherein the inside wall surface forms a vertical wall parallel to the vertical axis.

The outside wall surface forms a beveled wall wherein the top of the crimping cup is larger in diameter than the bottom of the crimping cup.

There is a lip formed at the top and on the inside surface of the crimping cap and a circumferential channel in the outside surface of the crimping cup, near the bottom thereof, and retained in the channel, an elastomeric ring to hold the two identical halves together. The lip is chamfered where the two identical halves interface with each other.

DESCRIPTION OF THE DRAWINGS

FIG. 4 is a full side view of a crimping tool of this on.

DETAILED DESCRIPTION OF THE DRAWINGS AND INVENTION

Figure 1:
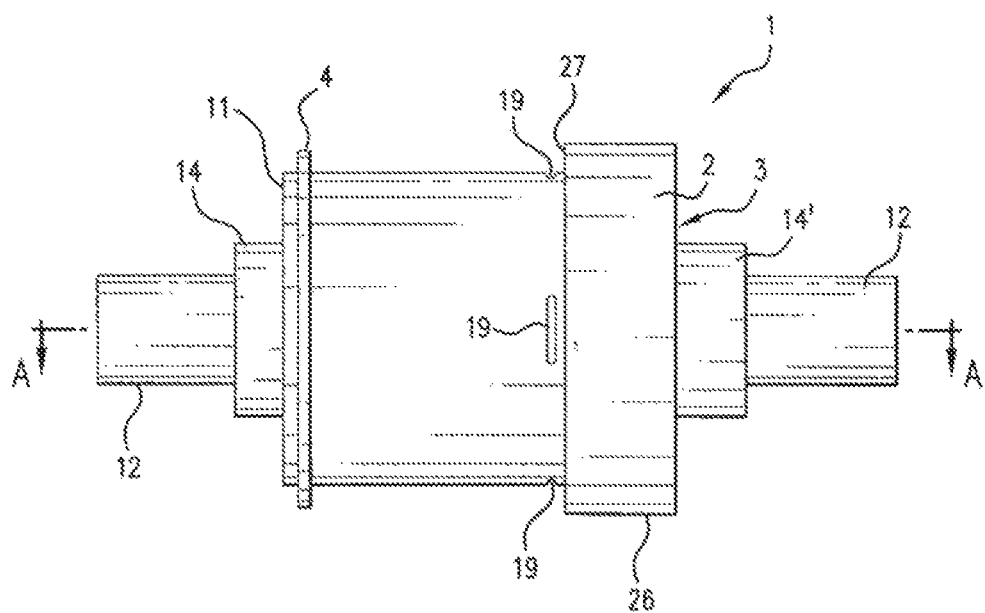
FIG. 1 is a full side view of a suspension module of this invention.

Turning now to the description of the invention and with regard to FIG. 1, there is shown a full side view of a suspension module 1 of this invention. Shown is the suspension module housing 2, the distal end 11 of the suspension module housing 2, the near end 3 of the suspension module 1 and the retainer ring 4 used to retain the suspension module 1 in the suspension knuckle 5. (shown in FIG. 3).

Figure 2:
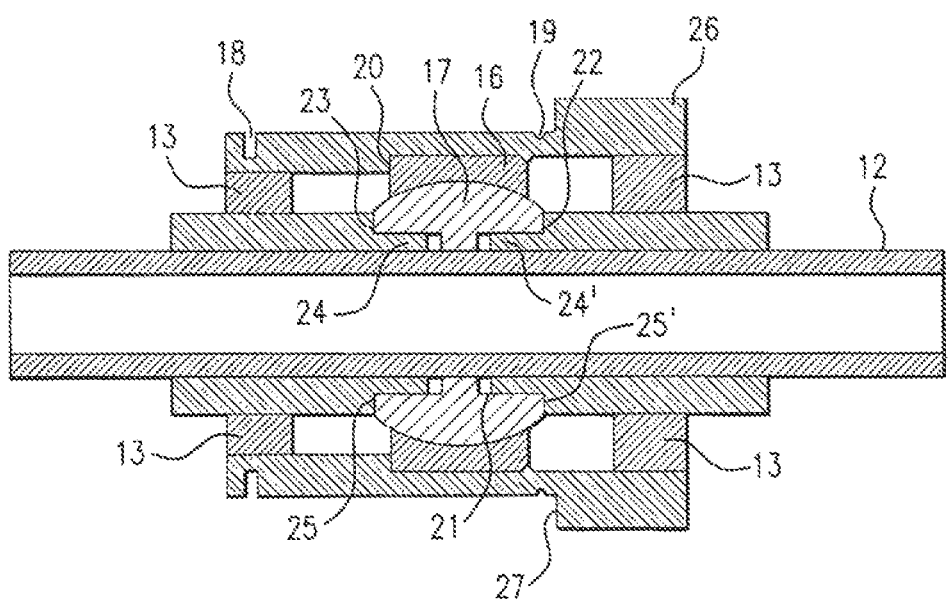
FIG. 2 is a cross sectional view of the device of FIG. 1 slightly reduced in size from FIG. 1 through line A-A.

FIG. 2 is a cross sectional view of the device of FIG. 1, through line A-A of FIG. 1. It should be noted that the suspension modules of this invention can be fabricated from metals or plastics depending on the vehicle that the device needs to be used in. The devices must be capable of carrying the load when they are employed in a suspension system of an automobile suspension system. Metals for example, are aluminum, steel, iron, brass, bronze, and the like. Preferred is aluminum because of the ease by which it can be crimped.

Plastics can be, for example, polyethylene, polypropylene, polyurethanes, polyepoxides, polyesters, cross linked polyethylene and the like. Preferred for this invention is the cross linked polyethylene.

Therein is shown the housing 2, the bearing 15, comprised of a bearing housing 16 and a spherical bearing 17. The spherical bearing 17 has an opening 21 through the center to accommodate the insertion of the adapter tubes 14 and 14' and rod 12 in through the adapter tubas 14 and 14'. The rod 12 is shown in phantom in this Figure.

In addition, there is shown the retainer ring channel 18 and the crimps 19. The retainer ring 4 when inserted in the retainer ring channel 18 prevents the suspension module 1 from backing out of the knuckle housing 7 and the crimp 19 and the machined stop 20 secure the spherical bearing 17 within the suspension module housing 2.

Figure 3:
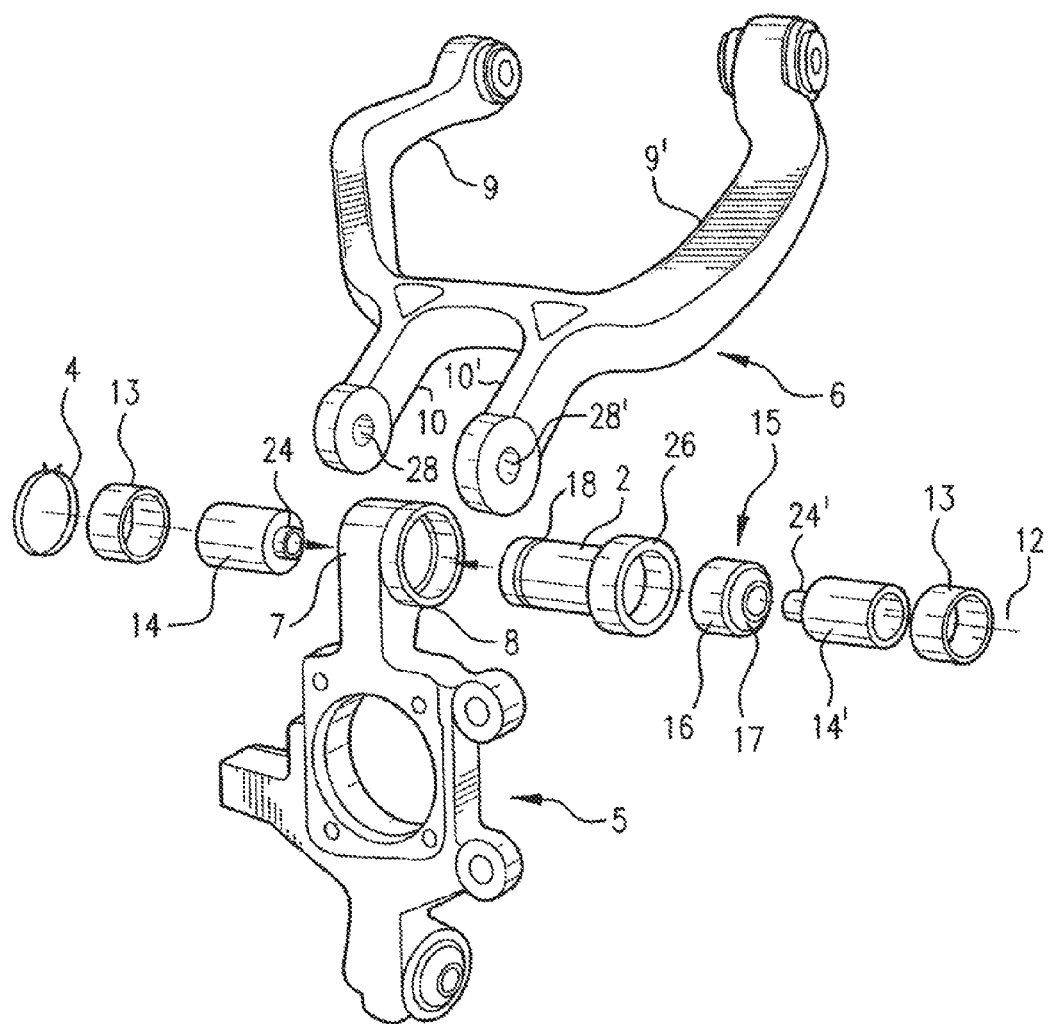
FIG. 3 is an exploded view in perspective of an upper control arm of a vehicle suspension system, in combination with a suspension knuckle of a vehicle suspension system and a suspension module of this invention without the rod being in place.

There are two adapter tubes 14 and 14' that are insertable in each end (the first end 22 and the second end 23) of the centered opening 21 in the spherical bearing 17. The adapter tubes 14 and 14' are essentially identical and are machined at a near end 24 and 24' to fit in the centered opening 21 and at the same time, create a machined shoulder that prevents the adapter tubes 14 and 14' from entering all the way into the centered opening 21. In FIG. 3, the centered opening 21 is exaggerated to show it herein, but in actual use, the adapter tubes 14 and 14' have a machine fit inside of the centered opening 21.

The near end, 3 of the suspension module housing 2 has a bell hub 26 machined therein to prevent the suspension module housing 2 from moving completely through the suspension knuckle housing 7 by virtue of the shoulder 27 created in the suspension module housing 2.

FIG. 3 is an exploded view in perspective of an upper control arm 6 of a vehicle suspension system, a portion of which is shown herein. There is also shown a suspension knuckle 5 of the vehicle suspension system having an integral housing 7 at the top 8 thereof. This integral housing 7 is where the suspension module 1 of this invention is used.

Situated just above the suspension knuckle 5 in FIG. 3 is a portion of an upper control arm 6 of a vehicle suspension system, said upper control arm 6 having two tipper extensions 9 and 9' and two lower extensions 10 and 10'.

The suspension module 1 of this invention is assembled and placed in the housing 7 of the suspension knuckle 5. Thereafter, a rod 12 (shown in FIG. 1 and in phantom in FIG. 2) is inserted into the suspension module 1 and it moves through a debris seal 13, an adapter tube 14, the spherical bearing 11 (and of course the middle of the housing), through another adapter tube 15 and another debris seal 16. The retainer ring 4 prevents the suspension module 1 from passing out of the suspension knuckle housing 5.

The two lower extension arms 10 and 10' of the upper control arm 6 are placed alongside the suspension knuckle housing 7 before the rod 12 is placed into the components. This rod 12 aligns all of the internal components in the suspension module 1 and allows the upper control arm 6 to be attached to the suspension knuckle 5 by moving the rod through openings 28 and 28' in the lower control arms 10 and 10'.

When the suspension module 1 is worn and needs to be replaced, the above outlined process is reversed and the old suspension module 1 is replaced by a new suspension module 1 by withdrawing the rod 12, moving the lower control arms 10 and 10' and removing the retainer ring 4.

Figure 4:
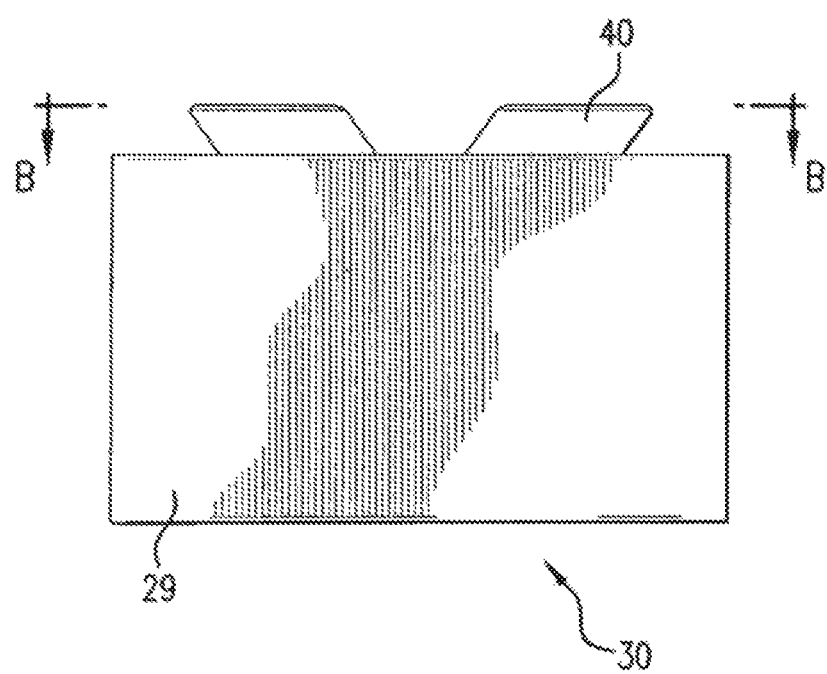

Turning now to a detailed description of the crimping tool of this invention, and with regard to FIG. 4, there is shown a full side view of a crimping tool 30 of this invention.

Therein is shown the cup holder 29 containing therein the crimping cup 40. The illustration in FIG. 4 shows the general relationship of the components 29 and 40 prior to pressing them together.

Figure 5:
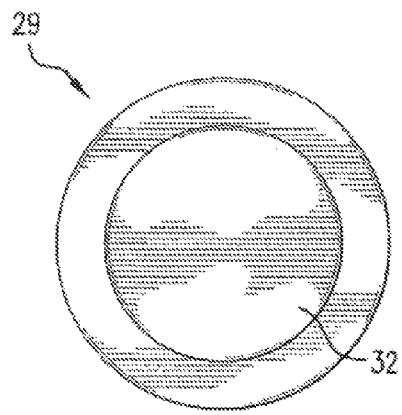
FIG. 5 is full top view of the cup holder of this invention.
Figure 6:
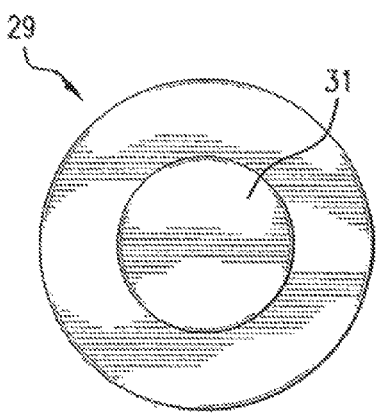
FIG. 6 is a full bottom view of the cup holder of this invention.

FIG. 5 shows a full top view of the cup holder 23 showing the larger (larger than the centered bottom opening 31) centered opening 32 and FIG. 6 shows a full top view of the bottom of the cup holder 29 and the centered opening 31.

Figure 7:
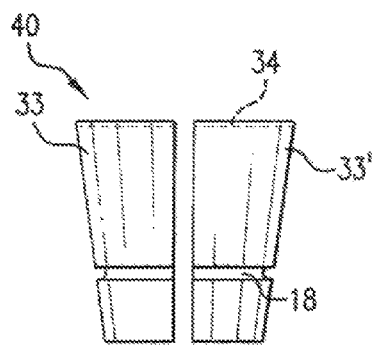
FIG. 7 is a full side view of a crimping cup of this invention that is open.

FIG. 7 is a full side view of the crimping cup 40 in an open position. Shown therein is the two identical halves 33 and 33' the protruding lip 34, shown in phantom, and the retainer ring channel 18.

Figure 8:
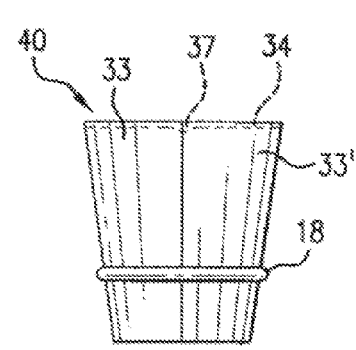
FIG. 8 is a full side view of a crimping cup of this invention that is entirely closed showing an elastomeric retainer ring.

In turn, FIG. 8 shows the same identical halves 33 and 33' in a closed position along with an elastomeric retainer ring 4. The elastomeric nature of the elastomeric retainer ring 4 is such that it should hold the two identical halves 33 and 33' together as shown in FIG. 7 but allow the two identical halves 33 and 33' to be separated to the extent that the interior wall 34 of the cup holder 29 will allow for insertion of a suspension module housing 2.

Figure 9:
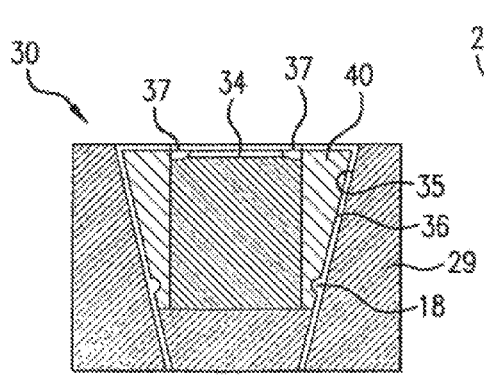
FIG. 9 is a cross sectional view of a crimping tool of this invention taken through line B-B of FIG. 4.

Turning now to FIG. 9, which is a cross sectional side view of the crimping tool 30 taken through line B-B of FIG. 4, there is shown the cup holder 29, the crimping cup 40, in a fully compressed mode. It should be noted that the beveled wall surface of the interior wall 35 of the cup holder 29 is beveled as is the exterior wall 36 of the crimping tool 40 such that the two walls mate and interface with each other.

Also shown in FIG. 9 is the retainer ring channel 18 and the lip 34, the lip 34 having chamfered portion 37 where the two identical halves 33 and 33' interface.

This separation is occasioned by the use of the crimping tool 30. Such use is as follows. A suspension module housing 2, containing a bearing 15 therein, with the bearing 15 positioned firmly up against the machined stop 20, is placed inside the crimping cup 40 and pushed down until the bell housing 26 meets and interfaces with the top 39 of the crimping cup 40. Thereafter, the crimping tool 40 is placed into the centered opening 32 through the top of the cup holder 29. This leaves the crimping cup 40 extended a short distance out of the top opening 32.

Thereafter, the entire assembly is placed in a device that will allow vertical pressure on the suspension module housing 2 which in turn places pressure on the bottom of the crimping cup 40 which, because of the interface of the beveled walls 35 and 36, causes the bottom of the two identical halves 33 and 33' to come together around the suspension module housing 2, which causes the top of the two identical halves 33 and 33' to come up against the outside wall 41 of the suspension module housing 2 wherein the leading edge of the lip 34 presses up against the outside wall 41 of the suspension module housing 2 and pushes a small portion of: the wall into the space within the suspension module housing 2, in a location just above the top or first end 22 of the spherical bearing 17 (see FIG. 1 at 19). This motion thus crimps the metal of the suspension module housing 2 over the bearing housing 16 to fix the bearing 15 in place within the suspension module housing 2.

Figure 10:
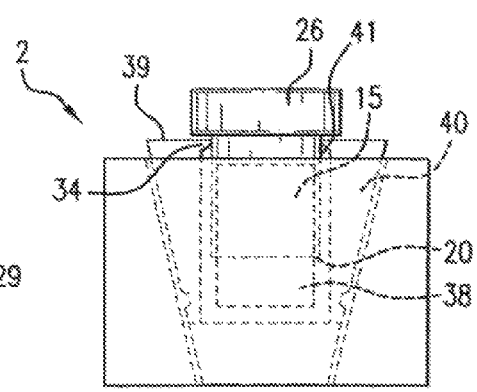
FIG. 10 is a full side view of a crimping tool of this invention showing in phantom, the beveled wall of the cup holder, the beveled wall of the crimping cup, the elastomeric retainer ring on the crimping cup, the vertical inside wall of the crimping cup, a spherical bearing and a housing of a suspension module.

In FIG. 10, there is shown a suspension module housing 2, the crimping cup 40, wherein the top of the crimping cup 40 extends a slight, distance above the top of the cup holder 29 while the remainder of the suspension module housing 2 is showing in phantom at 38 along with phantom illustrations of the bevel wall 35 the beveled wall 36, a bearing 15, the retainer ring 4, the machined stop 20, wherein the lip 34 is exaggerated to provide clarification to the Figure.

The device of this invention provides a very slight crimp in the wall of the suspension module housing 2. The reason for this controlled crimping is that it takes very little to hold the bearing in place within the suspension module housing 2 and if the crimp is taken to excessively, it tends to weaken the wall of the suspension module housing 2 to the extent that it will break in service. Thus, the device of this invention provides just the right amount of crimping to hold the bearing 15 within the suspension module housing 2 without weakening the wall of the suspension module housing 2. Crushing the wall of the suspension module housing 2 should be avoided at all costs.

Figure 11:
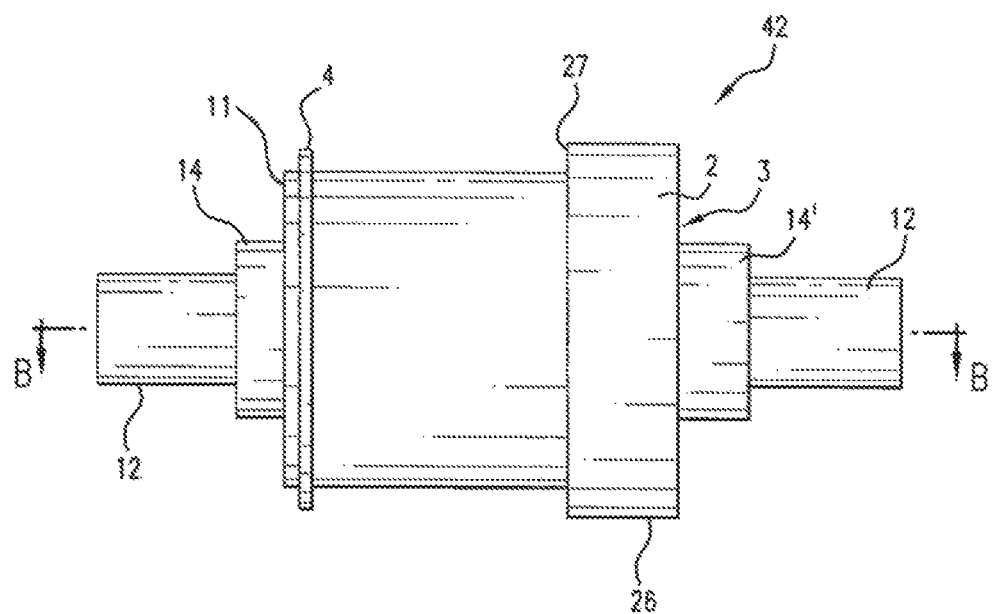
FIG. 11 is a full side view of another embodiment of a suspension module of this invention.

Shown in FIG. 11 is another embodiment of this invention which is a suspension module 42 that does not use a crimping system to hold the bearing 15 within the suspension module housing 2.

Figure 12:
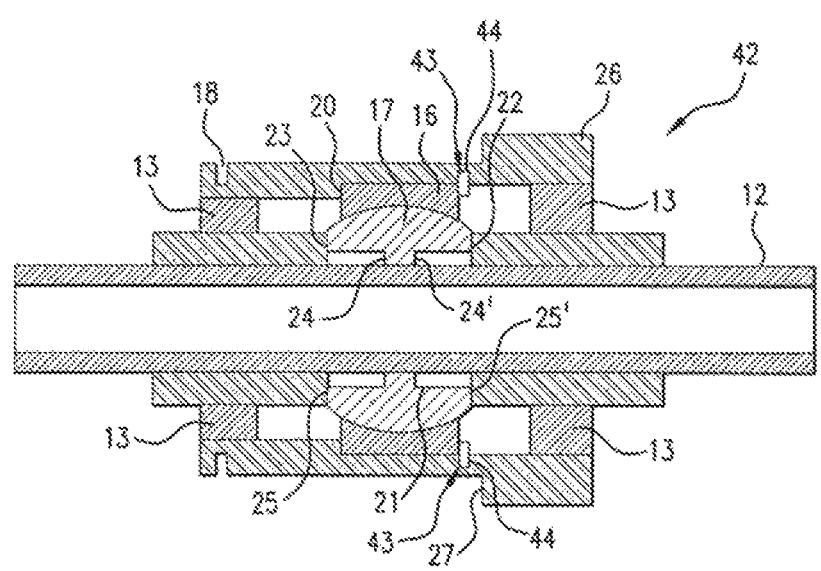
FIG. 12 is a cross sectional view of the device of FIG. 11 slightly reduced in size from FIG. 1, through line B-B.

This embodiment of the invention deals with the use of a snap ring 43 to hold the bearing 15 in the suspension module housing 2 as shown in FIG. 12. The snap ring 43 is inserted into a snap ring groove 44 that is machined into the internal surface of the suspension module housing 2.

What is claimed is:

1. A mechanical crimping device comprising in combination a cup holder and a crimping cup:
   a. wherein the cup holder has a centered opening therethrough; said centered opening having a vertical axis and an inside wall, wherein a top of the centered opening is larger in diameter than a bottom of the centered opening to create in the inside wall, a beveled surface;
   b. the crimping cup comprised of two identical halves having an outside wall surface, an inside wall surface, a top and a bottom, wherein. the inside wall surface forms a vertical wall parallel to the vertical axis; the outside wall surface forming a beveled wall wherein the top of the crimping cup is larger in diameter than the bottom of the crimping cup;
   c. there being a lip formed at the top and on the inside surface of the crimping cup;
   d. there being a circumferential channel in the outside surface of the crimping cup, near the bottom thereof, and retained in the channel,
   e. an elastomeric ring to hold the two identical halves together; the lip being chamfered where the two identical halves interface with each other.

* * * * *